US012243695B2

(12) United States Patent
Rhein et al.

(10) Patent No.: US 12,243,695 B2
(45) Date of Patent: Mar. 4, 2025

(54) LOAD BREAK ASSEMBLY

(71) Applicant: Hubbell Incorporated, Shelton, CT (US)

(72) Inventors: David Adelbert Rhein, Birmingham, AL (US); Ian Charles Klein, Birmingham, AL (US); Jacob Blake, Leeds, AL (US)

(73) Assignee: Hubbell Incorporated, Shelton, CT (US)

( * ) Notice: Subject to any disclaimer, the term of this patent is extended or adjusted under 35 U.S.C. 154(b) by 73 days.

(21) Appl. No.: 18/094,009

(22) Filed: Jan. 6, 2023

(65) Prior Publication Data

US 2023/0223209 A1 Jul. 13, 2023

Related U.S. Application Data

(60) Provisional application No. 63/297,475, filed on Jan. 7, 2022.

(51) Int. Cl.
*H01H 3/38* (2006.01)
*H01H 1/14* (2006.01)

(52) U.S. Cl.
CPC ................ *H01H 3/38* (2013.01); *H01H 1/14* (2013.01)

(58) Field of Classification Search
CPC .. H01H 3/02; H01H 3/32; H01H 3/38; H01H 1/12; H01H 1/14; H01H 1/20; H01H 1/24; H01H 1/242; H01H 33/00; H01H 33/04; H01H 33/02; H01H 33/12; H01H 33/125; H01H 33/121; H01H 33/53; H01H 2009/30; H01H 2009/24; H01H 2300/056
USPC .......................................................... 200/238
See application file for complete search history.

(56) References Cited

U.S. PATENT DOCUMENTS

| | | | | |
|---|---|---|---|---|
| 2,785,254 | A | 3/1957 | Atkinson | |
| 2,811,612 | A | 10/1957 | Atkinson | |
| 5,485,136 | A | 1/1996 | Johnson et al. | |
| 10,022,208 | B2 * | 7/2018 | Yoshida ............... | A46B 5/0095 |
| 2006/0200924 | A1 | 9/2006 | Hampton | |

OTHER PUBLICATIONS

PCT/US2023/010306 International Search Report and Written Opinion dated Jul. 3, 2023 (14 pages).

* cited by examiner

*Primary Examiner* — Anthony R Jimenez
(74) *Attorney, Agent, or Firm* — Michael Best & Friedrich LLP

(57) ABSTRACT

A load break tool for opening a high load electrical switch having a first switch contact and a second switch contact. The load break tool includes a main body extending along a longitudinal axis between a first end and a second end. The main body is movable between an extended configuration and a retracted configuration. A first contact is coupled to the first end and configured to selectively couple with the first switch contact. A second contact is coupled to the second end and configured to selectively couple with the second switch contact. In the retracted configuration the first contact is in electrical communication with the second contact. A spring assembly is mounted in the main body for biasing the main body to the retracted configuration, the spring assembly including a compression spring.

18 Claims, 9 Drawing Sheets

LOAD BREAK ASSEMBLY

RELATED APPLICATIONS

The present application claims priority to U.S. Provisional Application No. 63/297,475, filed on Jan. 7, 2022, the entire contents of which is incorporated by reference herein.

FIELD

The present application relates, generally, to a load break tool for opening a high-voltage electrical system under load and more particularly to such a tool that operates without producing an external arc between the contacts. According to various aspects the load break tool prevents an external arc by drawing the arc through a thin, confined space filled with air.

SUMMARY

In one exemplary embodiment, a load break tool for opening a high load electrical switch having a first switch contact and a second switch contact is disclosed. The load break tool includes a main body extending along a longitudinal axis between a first end and a second end. The main body is movable between an extended configuration and a retracted configuration. A first contact is coupled to the first end and configured to selectively couple with the first switch contact. A second contact is coupled to the second end and configured to selectively couple with the second switch contact. In the retracted configuration the first contact is in electrical communication with the second contact. A spring assembly is mounted in the main body for biasing the main body to the retracted configuration, the spring assembly including a compression spring.

In another exemplary embodiment, a load break tool is disclosed including an outer tube extending along a longitudinal axis and defining a first cavity, the outer tube including an outer tube end cap. An inner tube is at least partially received inside the first cavity and defines a second cavity. The inner tube is movable with respect to the outer tube along the longitudinal axis between a retracted position and an extended position. A spring assembly is slidably received in the second cavity and selectively coupled to the inner tube. The spring assembly comprises a guide rod fixed to the outer tube and extending into the second cavity, the guide rod including a first surface. A spring tube is coaxially mounted around the guide rod and selectively axially coupled to the inner tube by a trigger assembly, the spring tube including a second surface. A compression spring is mounted between the first surface and the second surface, wherein when the spring tube is coupled to the inner tube by the trigger assembly, the compression spring biases the inner tube toward the retracted position.

Other aspects of the exemplary embodiments disclosed will become apparent by consideration of the detailed description and accompanying drawings.

DETAILED DESCRIPTION

Before any embodiments of the disclosure are explained in detail, it is to be understood that the instant disclosure, and the devices and methods described herein, are not limited in their application to the details of construction and the arrangement of components set forth in the following description or illustrated in the following drawings. The devices and methods in this disclosure are capable of other embodiments and of being practiced or of being carried out in various ways.

Load break tools are used to open disconnects, cutouts, power fuses, fuse limiters, and other electrical switches under load. Load break tools prevent an external arc between the contacts of the switch when the switch is disconnected. External arcs can be carried to nearby components and cause electrical shorting or other damage to the components. In extreme cases, external arcs can cause fires. Load break tools extinguish an arc by drawing the arc through a thin, confined spaced of air, limiting the potential for damage before the arc disperses.

Figure 1:
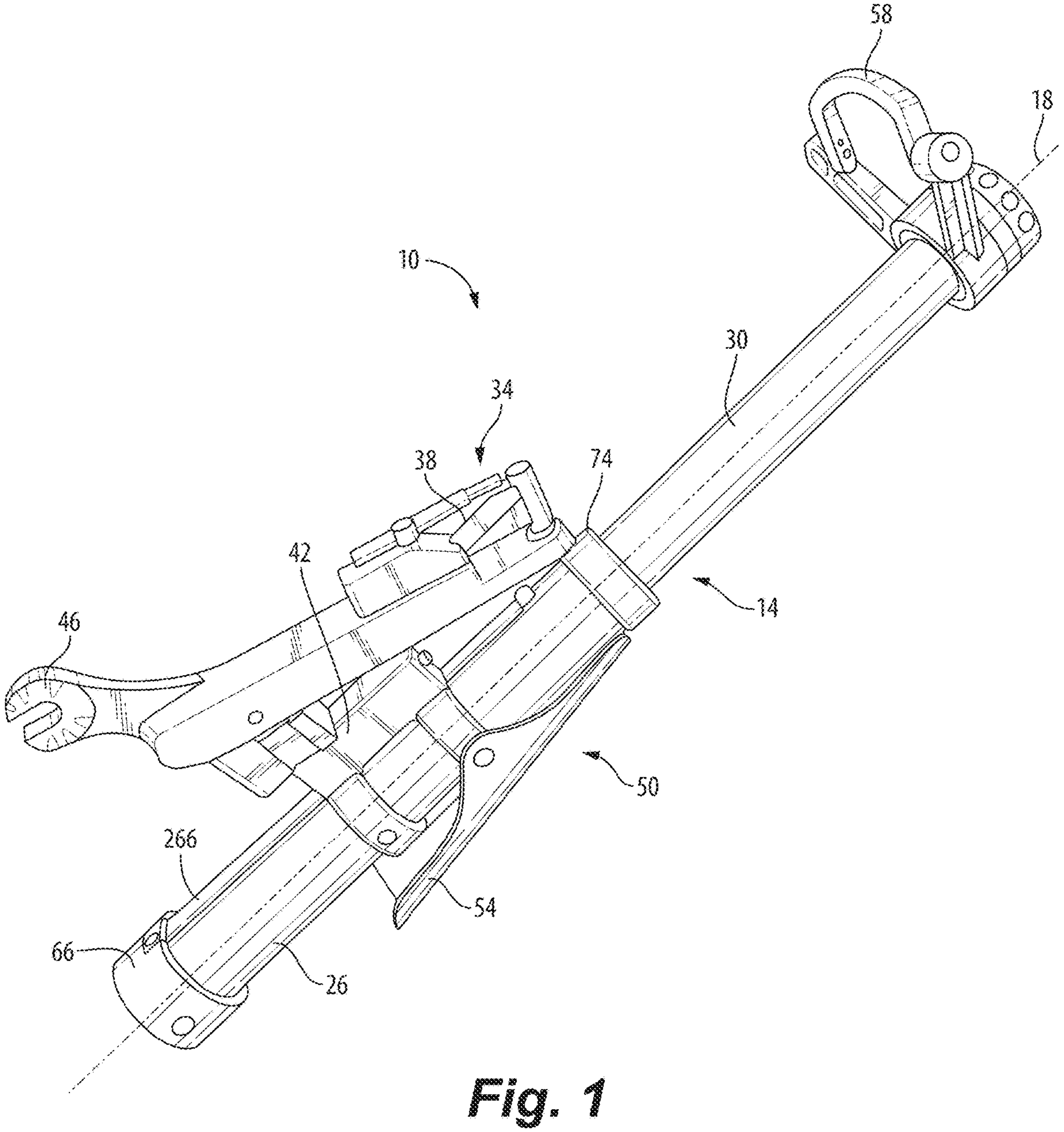
FIG. 1 is a perspective view of a load break tool.

FIG. 1 illustrates an exemplary load break tool 10. The load break tool 10 includes a main body 14 or a tube assembly extending along a tool axis 18. In the illustrated embodiment, portions of the load break tool 10 are referred to using directional terms such as upper and lower, or top and bottom. These terms are refer to the frame of reference shown in FIG. 1. The use of such directional terms is not meant to limit the orientation of the load break tool.

According to exemplary embodiments, the main body 14 includes an outer tube 26 formed as a cylindrical pipe extending along the tool axis 18. An inner tube 30, similarly formed as a cylindrical pipe, is slidably received in an upper end of the outer tube 26. The main body 14 is movable between an extended configuration, in which the inner tube 30 extends from the upper end of the outer tube 26, and a retracted configuration, in which the inner tube 30 is mostly received within the outer tube 26. The load break tool 10 further includes a clip assembly 34. In the illustrated embodiment, the clip assembly 34 is a spring biased clip assembly 34 and includes a gate 38 biased into a closed position. The gate 38 selectively allows a component, such as a switch contact, to be engaged by the clip assembly 34. The clip assembly 34 is mounted on a bracket 42 that also supports a universal adapter 46. The bracket 42 is mounted to the outer tube 26. The universal adapter 46 couples the load break tool 10 with an insulated pole, such as a hot stick, or any other structure used by an operator to maneuver the load break tool 10. The universal adapter 46 transfers forces from the insulated pole to the clip assembly 34 and the outer tube 26. A release clamp assembly 50 is mounted to the outer tube 26 opposite the clip assembly 34. In some embodiments, the release clamp assembly 50 is mounted to the outer tube 26 using the same bracket 42. In other embodiments, the release clamp assembly 50 may be separately mounted. The release clamp assembly 50 includes a release paddle 54 mounted to the outer tube 26 for movement between a locked position and a release position. The load break tool 10 further includes a hook loop 58 coupled to the upper end of the inner tube 30. The hook loop 58 is configured to engage a second contact of the switch.

Figure 2:
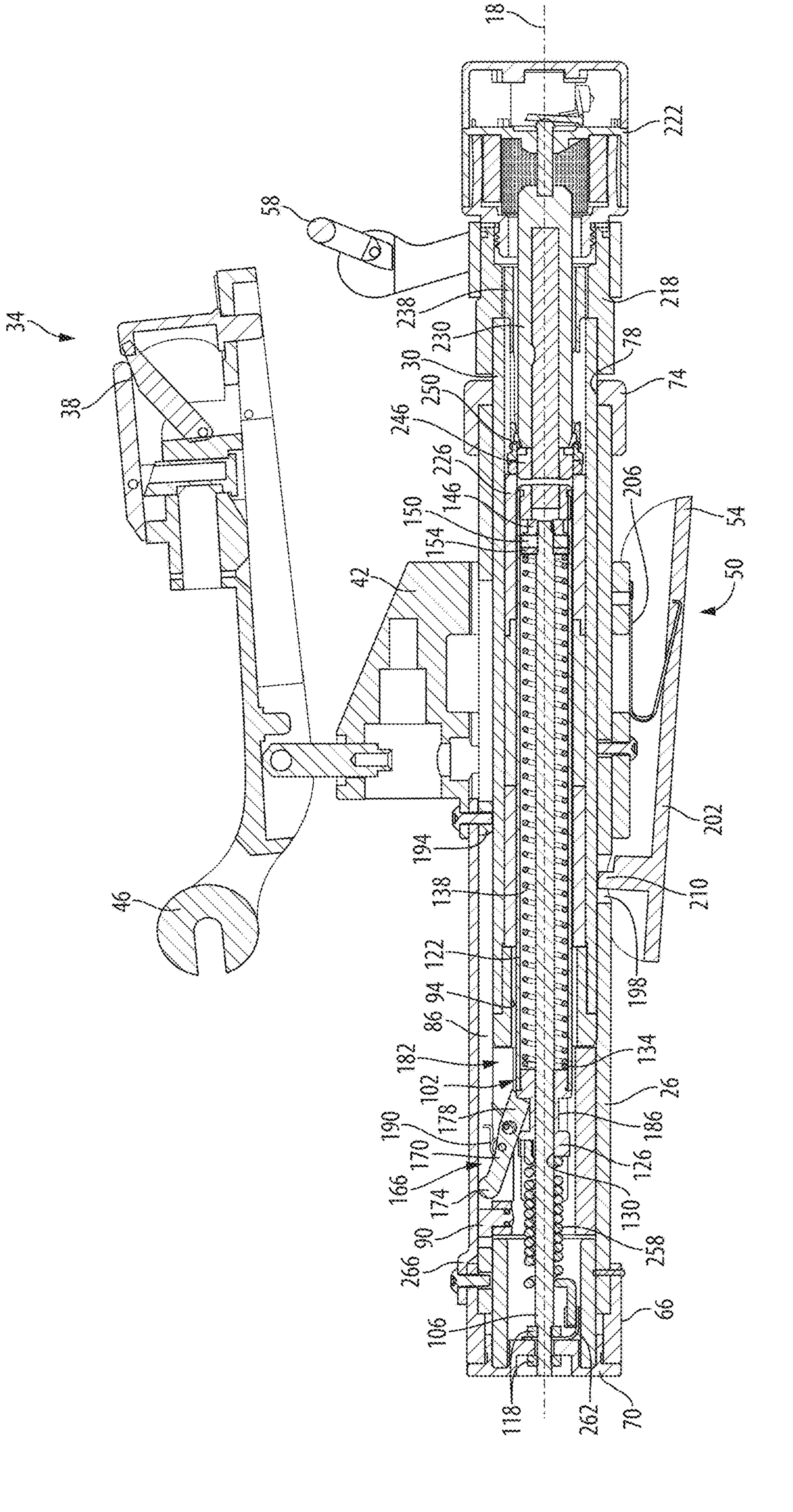
FIG. 2 is a cross sectional view of the load break tool of FIG. 1 in a closed position.
Figure 2A:
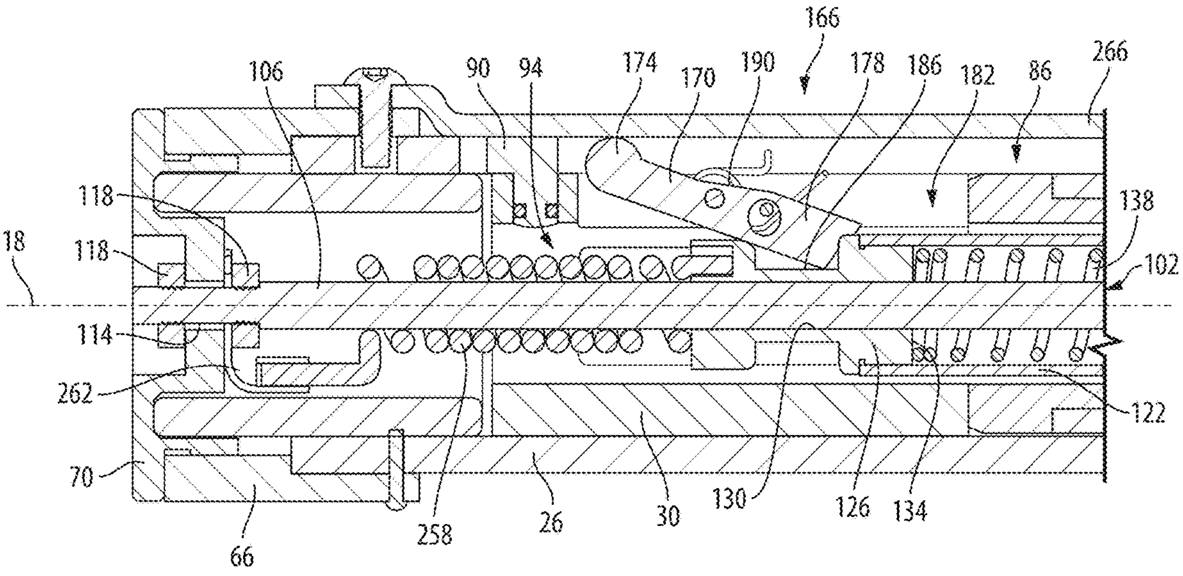
FIG. 2A is a close-up view of a first end of the tool of FIG. 2.
Figure 2B:
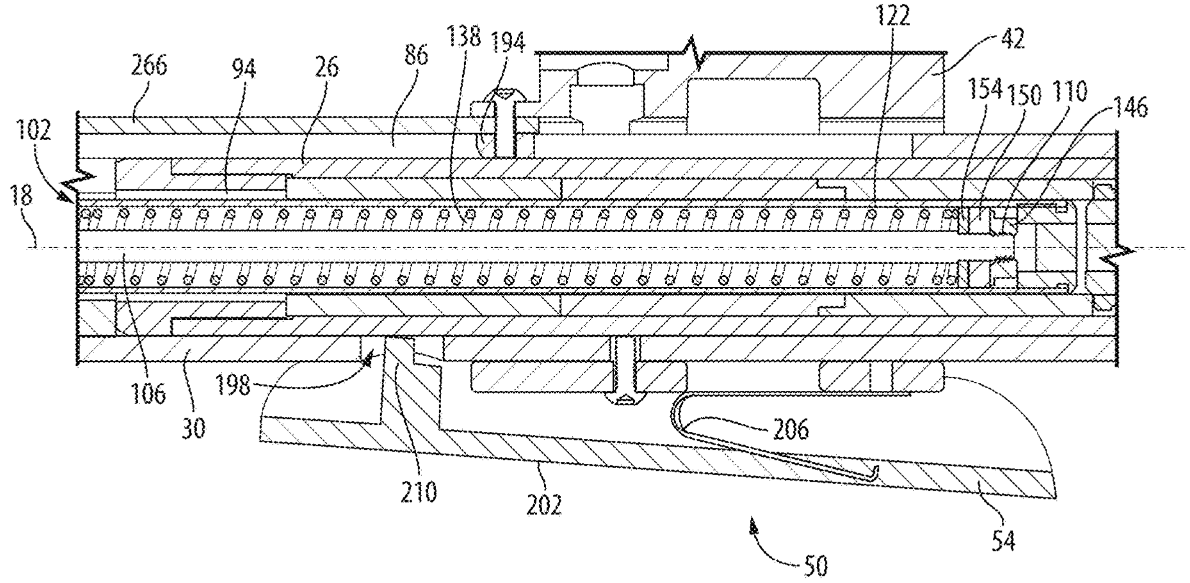
FIG. 2B is a close-up view of a middle of the tool of FIG. 2.
Figure 2C:
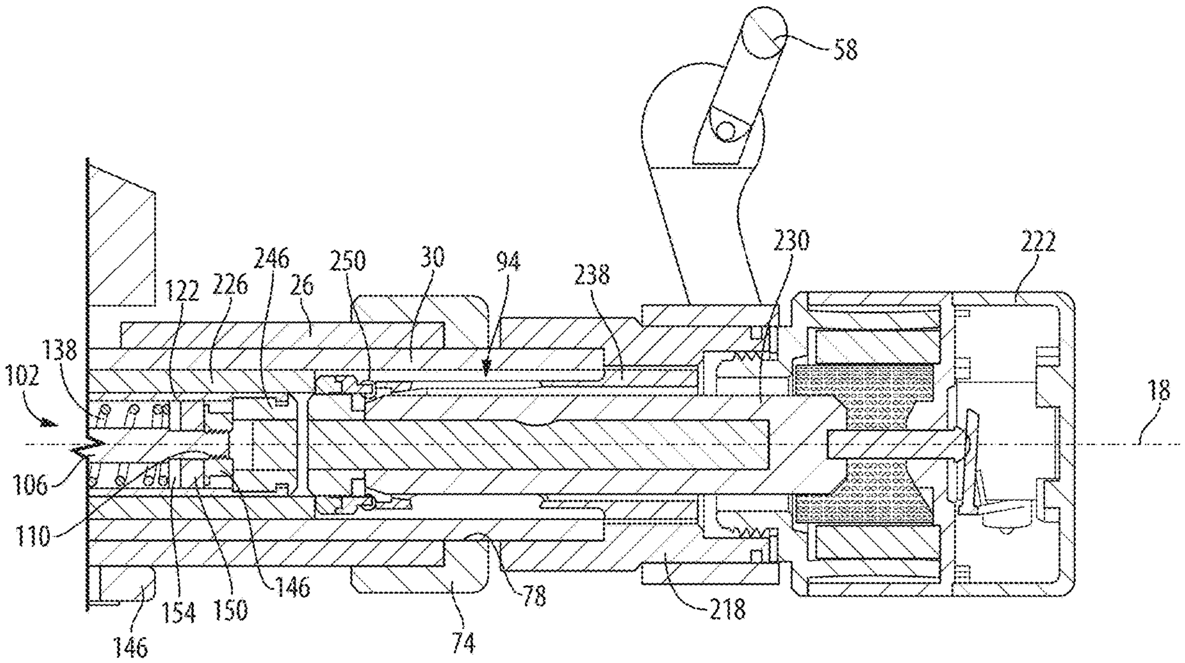
FIG. 2C is a close-up view of a second end of the tool of FIG. 2.

With respect to FIGS. 2-2C, the load break tool 10 is illustrated in a closed position. In the closed configuration, the main body 14 is in the retracted position, such that the lower end of the inner tube 30 is adjacent the lower end of the outer tube 26.

As shown in FIGS. 2 and 2A, the outer tube 26 includes an outer tube base 66 fixed to the bottom of the outer tube 26. An outer tube lower end cap 70 is coupled to the outer tube base 66. An outer tube upper end cap 74 is coupled to the upper end of the outer tube 26 and includes a central opening 78 surrounding and supporting the inner tube 30. An axial slot 86 extending from near the lower end of the outer tube 26 along the length of the outer tube 26 toward the upper end of the outer tube 26. In the illustrated embodiment, the axial slot 86 is positioned on the same side as the clip assembly 34 and opposite the release clamp. The inner tube 30 includes a guide projection 90 extending into the axial slot 86. The guide projection 90 prevents rotation of the inner tube 30 with respect to the outer tube 26. The inner tube 30 defines an inner cavity 94.

With reference to FIGS. 2, 2A, and 2B, a spring assembly 102 is mounted within the main body 14. The spring assembly 102 includes a spring guide rod 106. As shown in FIGS. 2 and 2A, the spring guide rod 106 is coupled to the outer tube lower end cap 70 and extends along the tool axis 18 into the inner cavity 94 of the inner tube 30. The spring guide rod 106 is coupled to the outer tube lower end cap 70 by a fastener 118. In the illustrated embodiment the spring guide rod 106 includes at least an upper threaded end 110 and a lower threaded end 114. In other embodiments the entire guide rod may be threaded, or the ends may be formed in other ways to allow for engagement by different types of fasteners. In the present embodiment, the spring guide rod 106 is coupled to the outer tube lower end cap 70 by a pair of nuts 118 threaded onto the threaded lower end of the spring guide rod 106 on either side of the outer tube lower end cap 70. As shown in FIGS. 2 and 2A, a spring tube 122 is slidably received in the inner cavity 94. The spring tube 122 is a hollow cylindrical tube which is positioned to surround the spring guide rod 106. A spring tube base 126 is coupled to the end of the spring tube 122 to enclose the lower end of the spring tube 122. The spring tube base 126 includes a central bore 130 which slidably received the spring guide rod 106. The spring tube base 126 further includes an end face 134. A compression spring 138 is positioned in the spring tube 122 surrounding the spring guide rod 106. The lower end of the compression spring 138 is braced against the end face 134 of the spring tube base 126. As shown in FIGS. 2 and 2B, the spring assembly 102 further includes a flange nut 146 secured to the upper threaded end 110 of the spring guide rod 106. The flange nut 146 retains a spring bushing 150 on the spring guide rod 106. The spring bushing 150 is slidable in the spring tube 122 and holds the spring guide rod 106 concentric to the spring tube 122. A washer 154 is positioned adjacent the spring bushing 150. The upper end of the compression spring 138 is braced against the washer 154.

With continued reference to FIGS. 2 and 2A, the spring tube 122 is axially fixed with respect to the inner tube 30 by a trigger assembly 166. The trigger assembly 166 includes a trigger 170 having an actuation end 174 and a locking end 178. The trigger 170 is rotatably mounted to the inner tube 30 adjacent the lower end of the inner tube 30. The trigger assembly 166 is mounted in a side opening 182 in the inner tube 30 and is movable between a closed position, in which the spring tube 122 is axially fixed with respect to the inner tube 30, and an open position, in which the spring tube 122 is permitted to axially displace or slide within the inner tube 30. In the closed position the locking end 178 of the trigger 170 engages a recess 186 formed in the spring tube base 126. The actuation end 174 extends past a side of the inner tube 30 and into the axial slot 86 formed in the outer tube 26. The trigger 170 is biased to the closed position by a biasing member 190. In the illustrated embodiment, the biasing member 190 is a double torsion spring 190. In the open position (see FIG. 4), the trigger 170 is pivoted such that the actuation end 174 does not extend into the axial slot 86 and the locking end 178 is moved out of the recess 186 in the spring tube base 126. The trigger 170 is moved to the closed position from the open position by an actuator 194 (FIGS. 2 and 2B) mounted to the outer tube 26. The actuator 194 presses against the actuation end 174 and overcomes the biasing force of the torsion spring 190 to move the actuation end 174 out of the axial slot 86 and the locking end 178 out of the recess 186.

With reference to FIGS. 2 and 2B, the release clamp assembly 50 is mounted adjacent an opening 198 in the outer tube 26. The release paddle 54 is part of a lever 202 that is mounted to the outer tube 26 by a leaf spring 206. The lever 202 also includes a locking projection 210 that is aligned with the opening 198 in the outer tube 26. The leaf spring 206 biases the lever 202 to an engaged position. In the engaged position (see FIG. 4), the locking projection 210 enters through the opening 198 and engages the lower end of the inner tube 30. When the load break tool 10 is in the closed configuration, the locking projection 210 is positioned in the opening 198 in the outer tube 26. When the release paddle 54 is moved to a release position, the locking projection 210 is removed from the opening 198 in the outer tube 26.

With reference to FIGS. 2 and 2C, the inner tube 30 includes an inner tube head 218. The hook loop 58 is mounted to the inner tube head 218. An inner tube end cap 222 is screwed into the inner tube head 218. The inner cavity 94 extends within the inner tube head 218 and the inner tube end cap 222. A liner 226 is positioned in the inner cavity 94 between the spring tube 122 and the inner tube 30. The liner 226 is axially fixed with respect to the inner tube 30. A trailer 230 is coupled to an upper end of the spring tube 122. The trailer 230 is axially fixed with respect to the spring tube 122.

The load break tool 10 is designed to divert a load through the load break tool 10 and then to break the circuit and disperse the resulting arc. Therefore, when the load break tool 10 is in a closed configuration, current is carried through the load break tool 10 from the hook loop 58 to the clip assembly 34. As shown in FIG. 2C, the hook loop 58 is secured to the inner tube head 218. A stationary contact 238 is mounted in the inner cavity 94 below the inner tube head 218 at the upper end of the inner tube 30 and is axially fixed with respect to the inner tube 30. The stationary contact 238 extends into and contacts the inner tube head 218. The trailer 230 is supported by the stationary contact 238.

With continued reference to FIG. 2C, a moving contact 246 is fixed to the lower end of the trailer 230. The stationary contact 238 at least partially surrounds the moving contact 246 and is biased into engagement by a garter spring 250.

The moving contact 246 is also fixed to the upper end of the spring tube 122. The moving contact 246 may include a tungsten-copper ring fitted at the end to provide additional strength and prevent arcing.

With reference to FIG. 2A, at the other end of the spring tube 122, a flexible current shunt 258 is fixed to the spring tube base 126. The flexible current shunt 258 in the present embodiment is shown as coiled around the spring guide rod 106, but in other embodiments may be otherwise arranged. The flexible current shunt 258 includes a ring terminal 262. The ring terminal 262 is fixed to the outer tube lower end cap 70 by the same fasteners 118 used to mount the spring guide rod 106. An outer current shunt 266 is mounted to the outer tube 26 over the axial slot 86. The outer current shunt 266 extends between the outer tube base 66 and the bracket 42 supporting the clip assembly 34.

Therefore, the current path extends from the hook loop 58 to the clip assembly 34. First, current is transferred from the hook loop 58, through the inner tube head 218, to the stationary contact 238. The stationary contact 238 transfers the current through the moving contact 246 to the spring tube 122. The spring tube 122 carries the current to the spring tube base 126 which transfers the current to the flexible current shunt 258. The current is carried through the ring terminal 262 of the flexible current shunt 258 to the outer tube lower end cap 70 and thereby to the outer tube base 66. The outer tube base 66 transfers the current to the outer current shunt 266 which carries the current to the bracket 42 and the clip assembly 34 to complete the circuit.

In operation, the load break tool 10 is fixed to the insulated pole at the universal adapter 46. The insulated pole is used by an operator, such as a lineman, to maneuver the load break tool 10 into position, and specifically into contact with both switch contacts. For example, the hook loop 58 can be connected to arcing horns of a switch. The clip assembly 34 can be connected to a pull ring of the switch. When the hook loop 58 is connected to the arcing horns and the clip assembly 34 has received the pull ring, the operator can use the insulated pole to pull the load break tool 10. The force applied to the universal adapter 46 displaces the outer tube 26 relative to the inner tube 30. This motion moves the load break tool 10 toward a tripping configuration.

Figure 3:
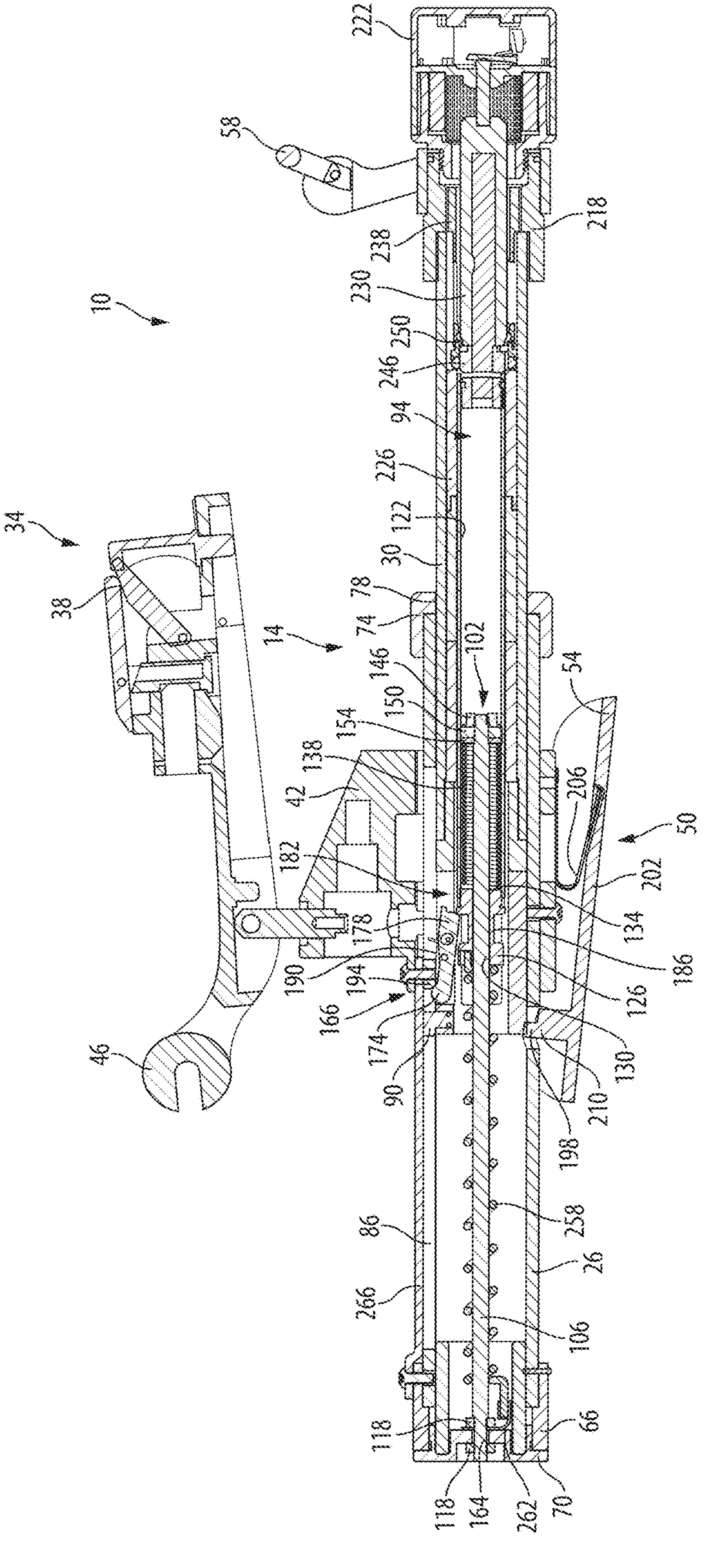
FIG. 3 is a cross sectional view of the load break tool of FIG. 1 in a trip position.

With reference to FIG. 3, the load break tool 10 is illustrated in a tripping configuration. The outer tube 26 has displaced downward, meaning the main body 14 is now in the extended configuration. The movement of the outer tube 26, and the connected outer tube base 66 and outer tube lower end cap 70, has displaced the spring guide rod 106 with respect to the inner tube 30. The trigger 170 is still in the closed position, axially fixing the spring tube 122 to the inner tube 30. The actuation end 174 of the trigger 170 is approaching the actuator 194 mounted to the outer tube 26. The spring tube base 126 has not moved with the spring guide rod 106; therefore, the compression spring 138 has been compressed between the washer 154 and the end face 134 of the spring tube base 126. The release clamp assembly 50 is still in an intermediate position where the locking projection 210 is received in the opening 198 in the outer tube 26. Current is still being conducted through the same path described with respect to the closed position. The flexible current shunt 258 has extended to account for the larger distance between the spring tube base 126 and the outer tube lower end cap 70.

Figure 4:
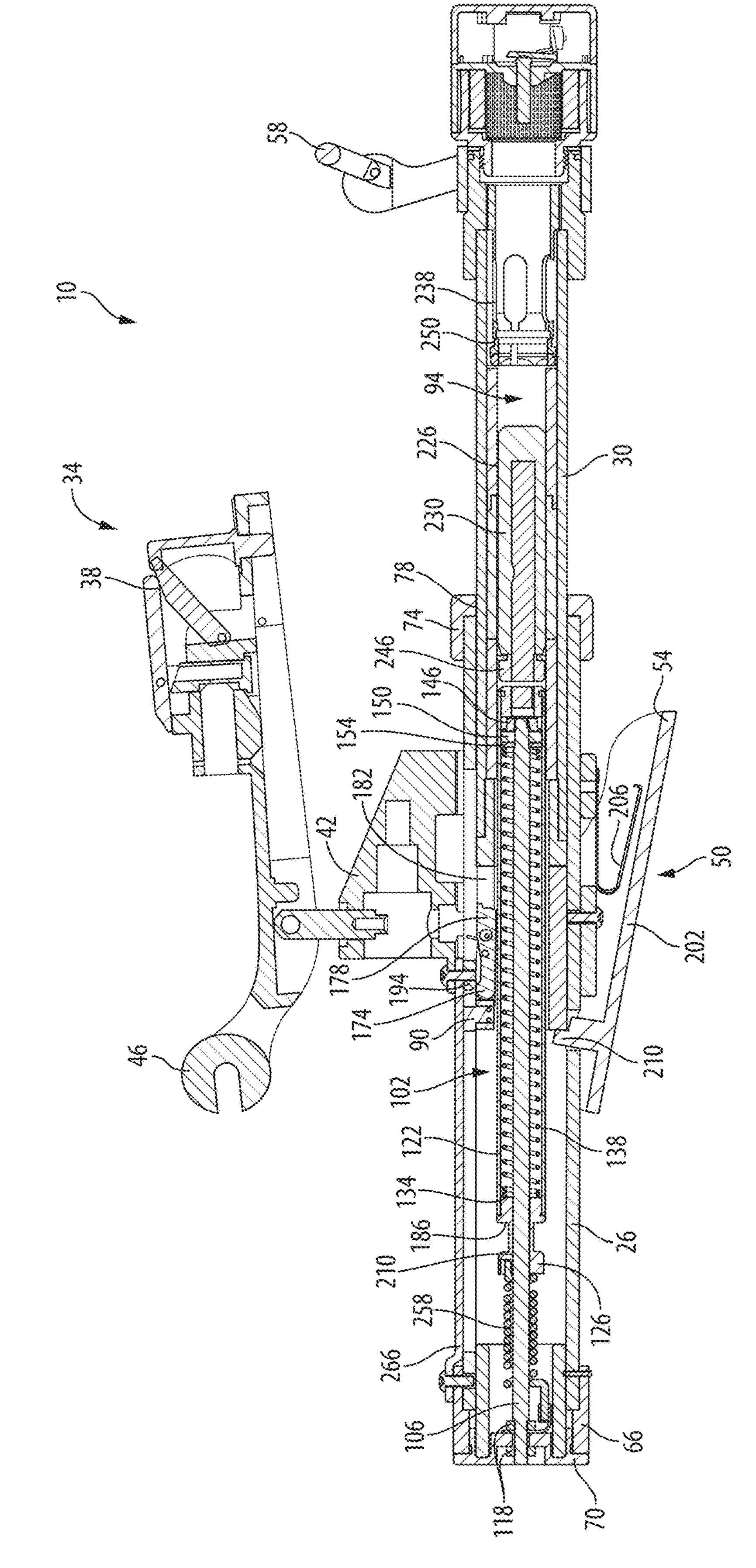
FIG. 4 is a cross sectional view of the load break tool of FIG. 1 in an open position.

With reference to FIG. 4, As the operator continues to move the insulated pole, the load break tool 10 trips and moves to the open configuration. As shown in FIG. 4, the further axial displacement of the outer tube 26 with respect to the inner tube 30 moves the actuation end 174 of the trigger 170 into engagement with the actuator 194. The actuation end 174 is thus moved out of the slot and the locking end 178 is moved out of the recess 186 in the spring tube base 126. The spring tube 122 is therefore free to slide with respect to the inner tube 30. Additionally, the displacement of the outer tube 26 with respect to the inner tube 30 moves the inner tube 30 past the opening 198 in the outer tube 26, allowing the locking projection 210 of the release clamp assembly 50 to move further into the outer tube 26 and engage the end of the inner tube 30. This locks the inner tube 30 from axial movement relative to the outer tube 26. The compressed spring exerts force between the spring tube base 126 and the washer 154 of the spring guide rod 106, moving the spring tube 122 relative to the outer tube 26, toward the outer tube lower end cap 70. This movement pulls the trailer 230 through the liner 226. During this motion, the current path is broken when the stationary contact 238 is no longer in contact with either the trailer 230 or the moving contact 246. At this point, the current attempts to form its own path through the air, however, as the trailer 230 moves through the liner 226, a gap is created between the trailer 230 and the liner 226. Any arcs created in this gap are quickly extinguished, and the circuit is broken.

The operator can then disengage the clip assembly 34 from the pull ring, and the hook loop 58 from the arc horns. The load break tool 10 remains in the open configuration until an operator moves the release paddle 54 to the release position, moving the locking projection 210 out from the opening 198 in the outer tube 26, and allowing the inner tube 30 to displace with respect to the outer tube 26 and to retract into the outer tube 26. Movement of the inner tube 30 into the retracted position allows the spring of the trigger assembly 166 to move the locking end 178 of the trigger 170 back into engagement with the recess 186 in the spring tube base 126. The load break tool 10 is then in the closed configuration once again.

Typical load break tools utilize a tension spring to move the trailer 230 through the liner 226. However, load break tools using these configurations have several disadvantages. The proposed design offers several advantages over tools with a standard configuration. First, the described load break tool 10 has an improved case of manufacture as well as improved case of repair or disassembly. The described load break tool 10 also removes complications associated with parts freely rotating inside of the assembly. Finally, the described load break tool 10 ensures the spring will be released at the same load repeatedly. This allows for improved wear predictions of the spring. Additionally, the improvements to the design do not affect the operation thereof, meaning the tool is intuitive to use and has increased performance compared to other tools.

Figure 5:
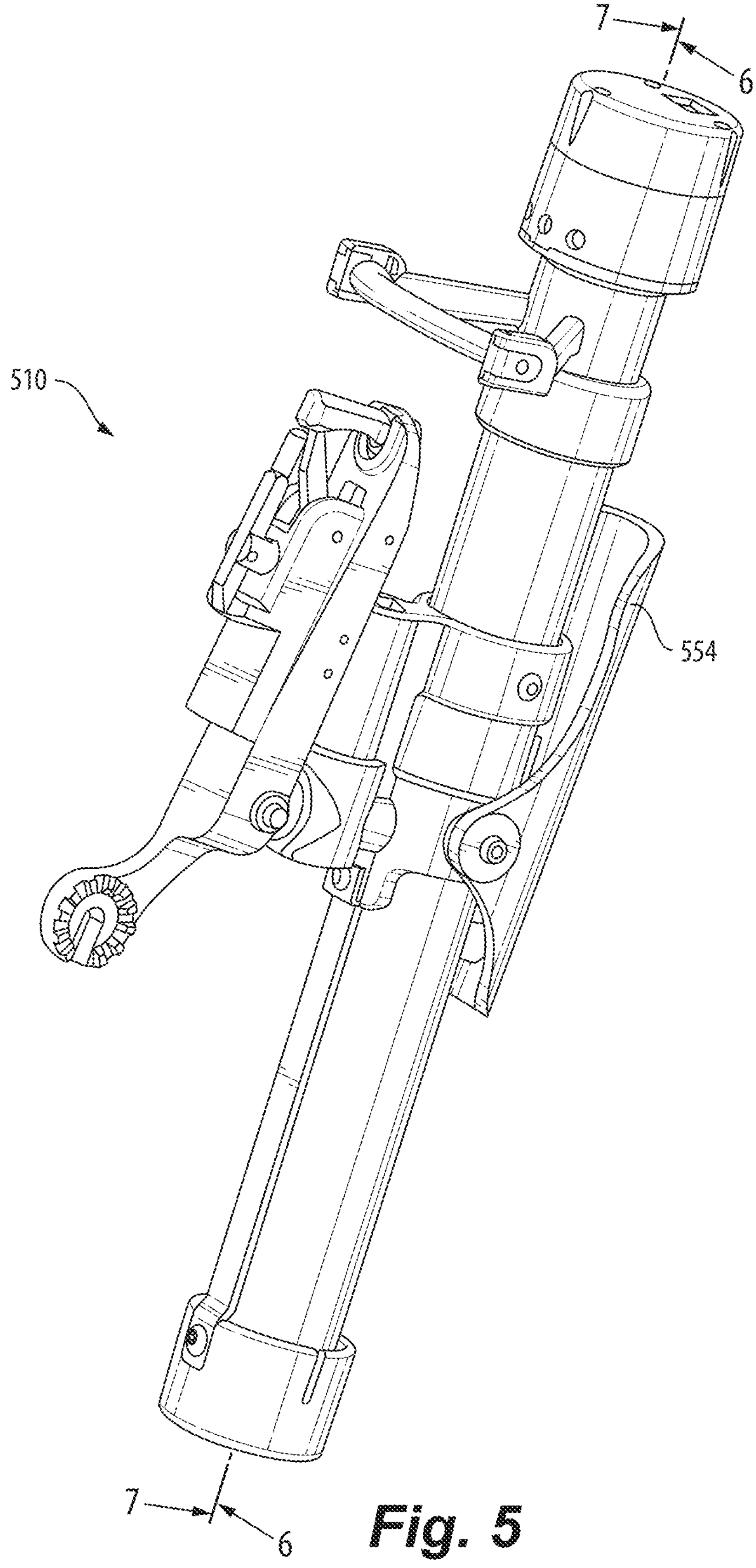
FIG. 5 is a perspective view of another embodiment of a load break tool.
Figure 6:
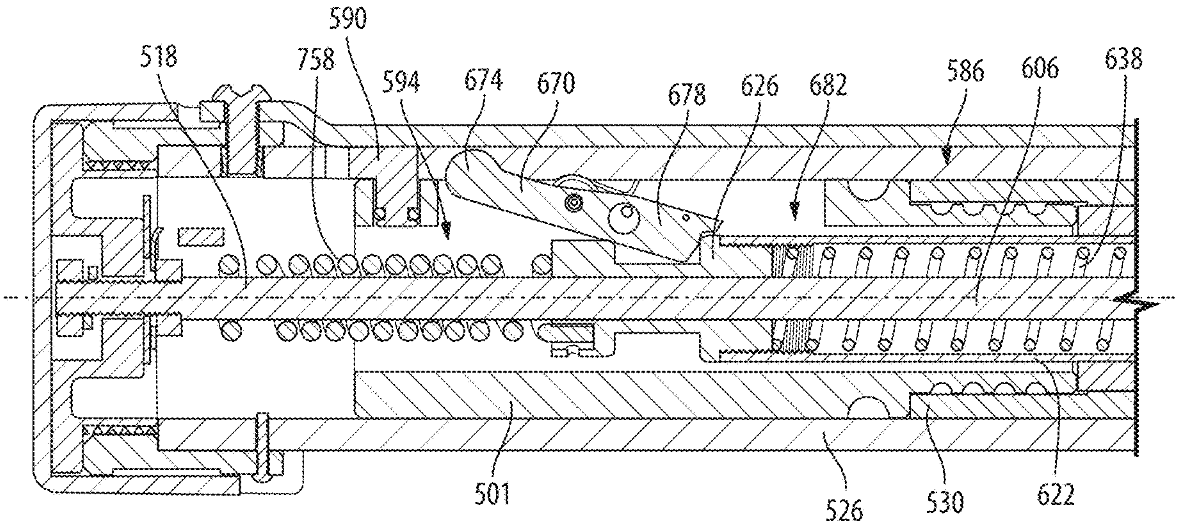
FIG. 6 is a cross sectional view of a first end of the load break tool of FIG. 5 along line 6-6.
Figure 7:
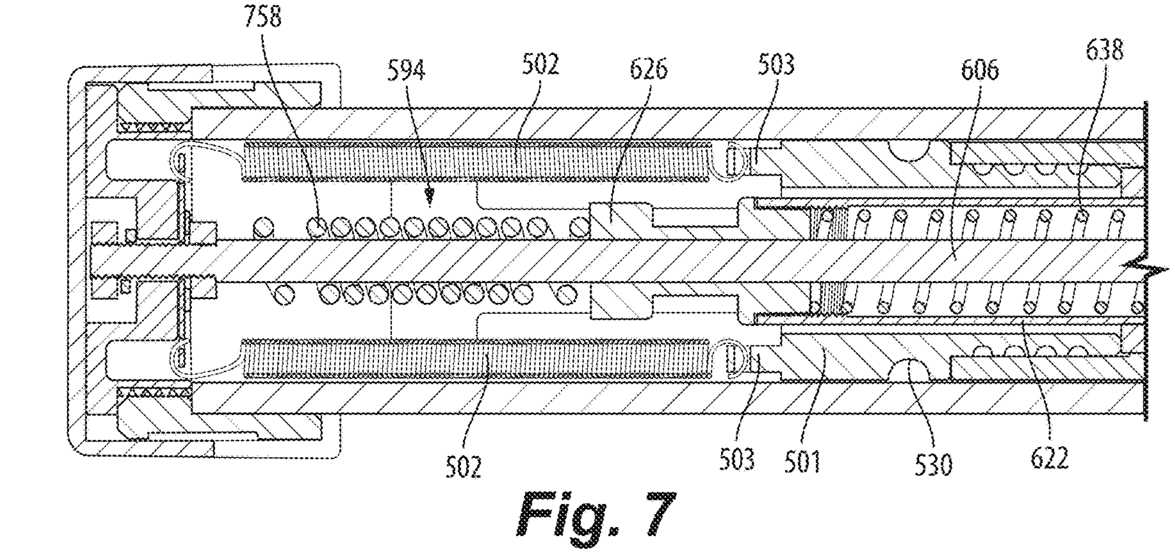
FIG. 7 is a cross sectional view of a first end of the load break tool of FIG. 5 along line 7-7.

Another exemplary load break tool 510 in accordance with one or more exemplary embodiments is shown in FIGS. 5-7. The tool 510 may be generally similar to the tool 10 illustrated in FIGS. 1-4, and similar features are identified with similar reference numbers, plus 500, where possible. For example, the tool 510 includes a release paddle 554. The description of load break tool 510 focuses on some differences between the tool 10 and the load break tool 510, although other differences may exist.

As seen in FIG. 6, the load break tool 510 includes the outer tube 526 and the inner tube 530 defining the inner cavity 594. In the illustrated embodiment, the load break tool 510 includes an end portion 501. The end portion 501 includes the guide projection 590 that extends into the axial slot 586 defined by the outer tube 526. The end portion 501 also includes the trigger 670 mounted in the opening 682 which is formed in the end portion 501 of the inner tube 530. The locking end 678 of the trigger engages the spring tube 622 until the actuation end 674 is moved toward the longitudinal axis 518 and the spring tube 622 is free to move with respect to the end portion 501. The spring tube 622 is driven to move by the spring 638, formed as a compression spring.

As seen in FIG. 7, the end portion 501 of the inner tube 530 is secured to the outer tube 526 by tension springs 502. In the illustrated embodiment, the load break tool 510 includes a pair of tension springs 502 disposed symmetrically about the longitudinal axis 518. In other embodiments, other amounts and positioning of springs may be used. The tension springs 502 extend between a first end that is secured to the outer tube 526, and a second end that is secured to a flange 503 of the end portion 501. In some embodiments, the first end of the tension springs may be coupled to the outer tube lower end cap, rather than coupling to the outer tube itself. In still further embodiments, the tension spring may be otherwise secured such that the first end remains stationary with respect to the outer tube 526.

In operation, as the tool 510 moves to the extended position (e.g., with the inner tube 530 extending from the outer tube 526), the tension springs 502 are stretched. Once the trigger 670 has been actuated, the spring tube 622 is driven toward the end of the outer tube 526 by the compression spring 638, while the inner tube 530 is retained in the extended position. The release paddle 554 may be actuated to release the inner tube 530 with respect to the outer tube 526. Once the inner tube 530 is released, the tension springs 502 may retract to pull the inner tube 530 back into the outer tube 526, until the trigger 670 engages the spring tube 622 once more.

The use of separate compression springs for the interruption of the circuit, and tension springs for the reset feature provides improved functionality of both operations. The compression spring is selected to optimize the speed of the interrupt, and the tension spring(s) is selected to separation of the springs for powering the interruption of the circuit, and the springs for facilitating the reset function allows for greater control and reliability.

Thus, the application provides, among other things, a load break tool with easy manufacturing, easy repair, less complications, and improved consistency. Various features and advantages of the application are set forth in the following claims.

What is claimed is:

1. A load break tool for opening a high load electrical switch having a first switch contact and a second switch contact, the load break tool comprising:

a main body extending along a longitudinal axis between a first end and a second end, the main body being movable between an extended configuration and a retracted configuration;

a first contact coupled to the first end and configured to selectively couple with the first switch contact;

a second contact coupled to the second end and configured to selectively couple with the second switch contact, wherein in the retracted configuration the first contact is in electrical communication with the second contact; and a spring assembly mounted in the main body for biasing the main body to the retracted configuration, the spring assembly including a compression spring, wherein the main body includes an outer tube with the first contact, an inner tube slidably received in the outer tube and having the second contact, and a spring tube slidably received in the inner tube, and wherein the compression spring is mounted in the spring tube.

2. The load break tool of claim 1, wherein the main body includes an outer tube and an inner tube slidably received in the outer tube, and wherein the outer tube includes an axial slot and the inner tube includes a guide projection configured to travel within the axial slot, preventing rotation of the inner tube with respect to the outer tube.

3. The load break tool of claim 2, wherein the inner tube is connected to the outer tube by at least one tension spring, and wherein the tension spring biases the main body to the retracted configuration.

4. The load break tool of claim 1, wherein in the extended configuration, the inner tube extends from an end of the outer tube, and in the retracted configuration, the inner tube is mostly received by the outer tube.

5. The load break tool of claim 4, wherein in the retracted configuration, the spring tube is axially fixed to the inner tube, and in the extended configuration the spring tube is axially movable with respect to the inner tube.

6. The load break tool of claim 5, wherein in the extended configuration, the compression spring biases the spring tube toward the first end.

7. The load break tool of claim 5, wherein in the retracted configuration the first contact is in electrical communication with the second contact through the spring tube and in the extended configuration the first contact is electrically isolated from the second contact.

8. A load break tool comprising:

an outer tube extending along a longitudinal axis and defining a first cavity, the outer tube including an outer tube end cap;

an inner tube at least partially received inside the first cavity and defining a second cavity, the inner tube being movable with respect to the outer tube along the longitudinal axis between a retracted position and an extended position;

a spring assembly slidably received in the second cavity and selectively coupled to the inner tube, the spring assembly comprising:

a guide rod fixed to the outer tube and extending into the second cavity, the guide rod including a first surface, a spring tube coaxially mounted around the guide rod and selectively axially coupled to the inner tube by a trigger assembly, the spring tube including a second surface, and a compression spring mounted between the first surface and the second surface, wherein when the spring tube is coupled to the inner tube by the trigger assembly, the compression spring biases the inner tube toward the retracted position.

9. The load break tool of claim 8, wherein when the spring tube is uncoupled from the inner tube by the trigger assembly, the compression spring biases the spring tube toward the outer tube end cap along the longitudinal axis.

10. The load break tool of claim 8, wherein the guide rod includes a nut and a washer coupled to an end of the guide rod distal from the outer tube end cap and wherein the washer forms the first surface.

11. The load break tool of claim 8, wherein the inner tube is held in the extended position by a release clamp assembly mounted to the outer tube and including a locking projection that engages a lower end of the inner tube.

12. The load break tool of claim 8, wherein the spring tube includes a spring tube base and the spring tube base forms the second surface.

13. The load break tool of claim 12, wherein the spring tube base includes a recess which is engaged by the trigger assembly to couple the spring tube to the inner tube.

14. The load break tool of claim 13, wherein the trigger assembly includes a trigger mounted on the inner tube and biased into engagement with the recess, and an actuator mounted on the outer tube and positioned to engage the trigger when the inner tube moves toward the extended position.

15. The load break tool of claim 8, wherein the trigger assembly is movable between an open state, allowing the spring tube to move with respect to the inner tube, and a closed state, axially fixing the spring tube to the inner tube, and wherein the trigger assembly is moved to the open state when the inner tube reaches the extended position.

16. The load break tool of claim 15, further comprising:

a release clamp assembly mounted to the outer tube and including a locking projection movable between a locking position, in which the locking projection engages a lower end of the inner tube to lock the inner tube with respect to the outer tube in the extended position, and a disengaged position, wherein the locking projection is biased into the locking position when the inner tube reaches the extended position, and wherein the inner tube is coupled to the outer tube by a tension spring, and wherein when the locking projection moves to the disengaged position, the inner tube is biased toward the retracted position by the tension spring.

17. The load break tool of claim 8, further comprising:

a first contact coupled to the inner tube;

a second contact coupled to the outer tube; and a current path extending between the first contact and the second contact when the spring tube is coupled to the inner tube, the current path traveling through the spring tube.

18. The load break tool of claim 17, wherein when the spring tube is uncoupled from the inner tube, the compression spring biases the spring tube away from the first contact, breaking the current path.

* * * * *